(12) United States Patent
Loeb (10) Patent No.: US 7,895,211 B2
(45) Date of Patent: Feb. 22, 2011

(54) METHOD AND SYSTEM FOR REINSERTING A CHAIN IN A HASH TABLE

(75) Inventor: Mitchell L. Loeb, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 11/556,609

(22) Filed: Nov. 3, 2006

(65) Prior Publication Data

US 2008/0109395 A1    May 8, 2008

(51) Int. Cl.
G06F 17/30 (2006.01)
G06F 7/00 (2006.01)
G06F 12/00 (2006.01)
G06F 9/26 (2006.01)

(52) U.S. Cl. .................. 707/747; 711/216; 707/797
(58) Field of Classification Search ............ 707/673, 707/698, 747, 797, 1, 2; 711/216
See application file for complete search history.

(56) References Cited

U.S. PATENT DOCUMENTS

| | | | | |
|---|---|---|---|---|
| 5,032,987 | A * | 7/1991 | Broder et al. | 711/221 |
| 5,197,002 | A * | 3/1993 | Spencer | 705/34 |
| 6,047,283 | A * | 4/2000 | Braun | 707/3 |
| 6,625,612 | B1 * | 9/2003 | Tal et al. | 707/102 |
| 2001/0042204 | A1 * | 11/2001 | Blaker et al. | 713/165 |
| 2002/0073276 | A1 * | 6/2002 | Howard et al. | 711/113 |
| 2006/0271539 | A1 | 11/2006 | Loeb | |
| 2006/0271540 | A1 * | 11/2006 | Williams | 707/7 |
| 2007/0112795 | A1 * | 5/2007 | Travison et al. | 707/100 |
| 2007/0192564 | A1 | 8/2007 | Loeb | |

OTHER PUBLICATIONS

Mitchell L. Loeb, Methods and Arrangements for Inserting Values in Hash Tables, U.S. Appl. No. 11/355,672.
F.A. Williams, Handling Identifiers as Internal Symbols in Language Processors, Communications of the ACM, vol. 6, No. 6 (Jun. 1959), pp. 21-24.
A.L. Tharp, File Organization and Processing, John Wiley & Sons, 1988, pp. 48-51.

* cited by examiner

Primary Examiner—Pierre M Vital
Assistant Examiner—Sabana Rahman
(74) Attorney, Agent, or Firm—Yee & Associates, P.C.; Yuanmin Cai (57) ABSTRACT

A method and system for reinserting a chain into a hash table of a computer system are described. The chain includes a plurality of keys. The hash table includes a key fields and link fields associated with the key fields. The hash table utilizes an initial collision resolution scheme that precludes coalescing of chains. The method and system include providing a binary tree including nodes corresponding to the keys of the chain. The nodes include a root node corresponding to a root key and at least one child node corresponding to at least one child key. The method and system also include storing a pair of child keys in two empty adjacent key fields and storing a first empty adjacent key value of one of the two empty adjacent key fields in the home link field if the root node is the parent node of more than one child node.

20 Claims, 9 Drawing Sheets

20

| | Key | Link | Other | |
|---|---|---|---|---|
| 22-0 | | | | 24-0 |
| 22-1 | | | | 24-1 |
| 22-2 | 13 | | | 24-2 |
| 22-3 | 17 | | | 24-3 |
| 22-4 | 42 | 3 | | 24-4 |
| 22-5 | 27 | 8 | | 24-5 |
| 22-6 | 28 | 9 | | 24-6 |
| 22-7 | 18 | 10 | | 24-7 |
| 22-8 | 16 | | | 24-8 |
| 22-9 | 39 | 4 | | 24-9 |
| 22-10 | 29 | | | 24-10 |

Prior Art

| | Key | Link | Other | |
|---|---|---|---|---|
| 22-0' | | | | 24-0' |
| 22-1' | | | | 24-1' |
| 22-2' | 13 | | | 24-2' |
| 22-3' | 17 | | | 24-3' |
| 22-4' | 39 | 3 | | 24-4' |
| 22-5' | 27 | 8 | | 24-5' |
| 22-6' | 28 | 4 | | 24-6' |
| 22-7' | 18 | 10 | | 24-7' |
| 22-8' | 16 | | | 24-8' |
| 22-9' | 42 | | | 24-9' |
| 22-10' | 29 | | | 24-10' |

| | Key | Link | Other |
|---|---|---|---|
| 202-0 | | | | 204-0
| 202-1 | | | | 204-1
| 202-2 | | | | 204-2
| 202-3 | | | | 204-3
| 202-4 | | | | 204-4
| 202-5 | 27 | | | 204-5
| 202-6 | 28 | | | 204-6
| 202-7 | 29 | 10 | | 204-7
| 202-8 | | | | 204-8
| 202-9 | | | | 204-9
| 202-10 | 18 | | | 204-10

| | Key | Link | Other | |
|---|---|---|---|---|
| 202-0 | | | | 204-0 |
| 202-1 | | | | 204-1 |
| 202-2 | | | | 204-2 |
| 202-3 | | | | 204-3 |
| 202-4 | | | | 204-4 |
| 202-5 | 27 | | | 204-5 |
| 202-6 | 39 | 9 | | 204-6 |
| 202-7 | 29 | 10 | | 204-7 |
| 202-8 | | | | 204-8 |
| 202-9 | 28 | | | 204-9 |
| 202-10 | 18 | | | 204-10 |

202 → Key, 204 → Link, 206 → Other

FIG. 8

| Key | Link | Other |
|-----|------|-------|
|     |      |       |
|     |      |       |
| 13  |      |       |
|     |      |       |
| 28  |      |       |
| 27  | 8    |       |
| 39  | 4    |       |
| 29  | 10   |       |
| 16  |      |       |
| 42  |      |       |
| 18  |      |       |

| Key | Link | Other |
|---|---|---|
|  |  |  |
|  |  |  |
| 13 |  |  |
| 17 |  |  |
| 39 |  |  |
| 27 | 8 |  |
| 28 | 3 |  |
| 29 | 10 |  |
| 16 |  |  |
| 42 |  |  |
| 18 |  |  |

METHOD AND SYSTEM FOR REINSERTING A CHAIN IN A HASH TABLE

FIELD OF THE INVENTION

The method and system relate to data storage and retrieval systems and more particularly, to reinserting a chain in hash tables.

BACKGROUND

Storing records in a data table and retrieving the records are common tasks. Various data structures, table organizations, and access techniques have been utilized to determine a location for storing an element of data and to determine the location in which an element of data has been stored. In general, the data may be stored in a table of records or elements, where each element has a collection of fields associated with it. In the table, each field is associated with one of a number of attributes that, together, make up the element. One of the attributes is the key that refers to the element and on which the searching is based. Various techniques for organizing a table include lists, binary search trees, digital search trees and hash tables.

Hashing is a method that stores data in a data table such that storing, searching, retrieving, inserting, and deleting data can be done much faster than by traditional linear search methods. Hashing transforms keys using a hash function, and maps the hashed keys to data table locations. The situation where every key, when hashed, produces a unique index, and thus corresponds to a unique location in the hash table, is known as perfect hashing. Such a situation is difficult to achieve. Typically, two or more keys hash to the same physical location, or home location. This is known as a collision. For example, a simple hash function may be: key mod 11. For such a hash function, the keys 27 and 60 both result in a hash of 5 and thus map to the same home location. Consequently, the keys result in a collision.

When a collision occurs among a group of keys, the keys may be stored in a chain joined together by links. The link for one key indicates the location of the next key in the chain. In a typical hash table, therefore, each record includes at least a key field and a link field. The key field stores the search key, while the link field stores a location of a next key in the chain. In order to determine the locations at which the keys in the chain are stored, a collision resolution scheme is used. Different collision resolution schemes may result in a different number of links being traversed in order to find a particular key. Accessing the link includes a call to a secondary storage device, or a probe. A measure of the efficiency of a collision resolution scheme is the average number of probes required for stored keys.

Figure 1:
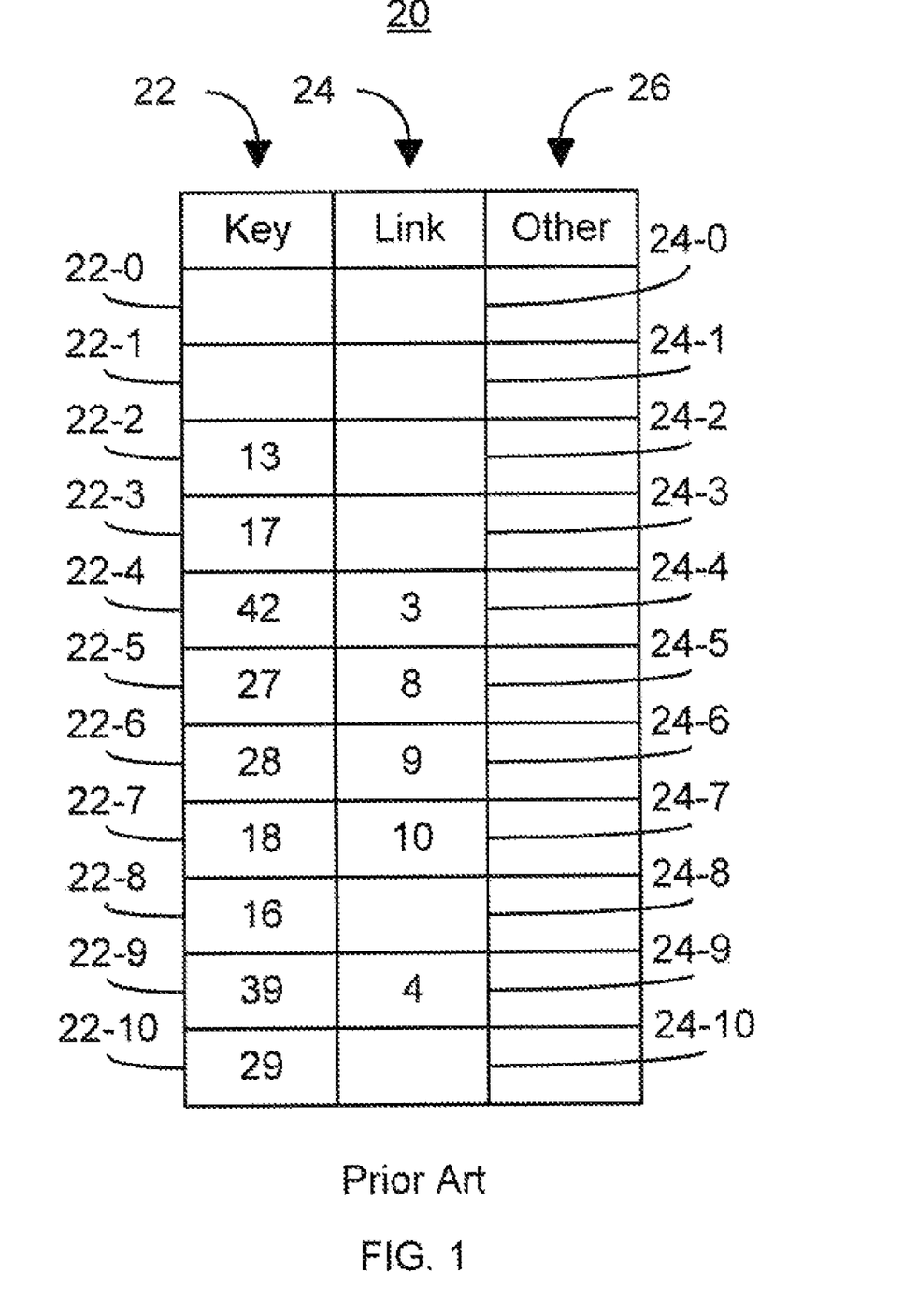
FIG. 1 depicts a conventional hash table using a conventional collision resolution mechanism.

For example, FIG. 1 depicts a conventional hash table 20. The conventional hash table 20 includes key fields 22, link fields 24, and other optional fields 26. The conventional hash table 20 uses a conventional collision resolution scheme known as LISCH (Late Insertion Standard Coalesced Hashing). In LISCH, a key that is hashed to a key field occupied by another key is stored in a first empty key field, or slot, from the bottom of the hash table 20. Each field 22, 24, and 26 includes locations 0, 1, 2, 3, 4, 5, 6, 7, 8, 9, and 10. Thus, the key fields are 22-0, 22-1, 22-2, 22-3, 22-4, 22-5, 22-6, 22-7, 22-8, 22-9, and 22-10 with corresponding link fields 24-0, 24-1, 24-2, 24-3, 24-4, 24-5, 24-6, 24-7, 24-8, 24-9, and 24-10. Suppose the keys 27, 18, 29, 28, 39, 13, 16, 42, and 17 are desired to be stored in the hash table 20 using the hash function key mod 11. The first two keys, 27 and 18, hash to different home locations. Thus, the key 27 is stored in key field 22-5 of the key field 22 while the key 18 is stored in key field 22-7 of the key field 22. Note that other data corresponding to these keys may be stored in the remaining field(s) 26. However, the key 29 hashes to the same home key field 22 (key field 22-7) as the key 18. Using LISCH, the key 29 is stored in the first open key field from the bottom of the hash table 20. Thus, the key 29 is stored in key field 22-10 and the value for (or address of) the location 10 is stored in the link field 24-7. The next key 28 hashes to key field 22-6, which is empty. The key 28 is stored in the key field of its home key field 22-6. The key 39 also hashes to key field 22-6. There is a collision between the keys 28 and 39. Using LISCH, the key 39 is stored in the key field 22-9 and the address for key field 22-9 is stored in the link field 24-6. The key 13 hashes to empty key field 22-2. The key 13 is thus stored in its home key field 22-2. However, the key 16 hashes to the same key field 22-5 as the key 27. Using LISCH, the key 16 is stored the next empty key field from the bottom of the hash table 20, or key field 22-8, and the address for key field 22-8 is stored in the link field 24-5. The next key 42 would has to a home key field 22-9. However, the key 39 is already stored in this key field 22. Using LISCH, the key 42 is stored in the next empty key field from the bottom, or key field 22-4, and the address for key field 22-4 is stored in the link field 24-9. The last key, 17, would map to key field 22-6. Thus, the last key 17 is part of the chain starting with the key 28. Using LISCH, the key 17 is stored in the next empty key field 22-3, and its location is added to the link field of the last key in the chain, or link field 24-4.

Note that the table 20 has a chain that includes 28, 39, 42, and 17. However, only keys 28, 39 and 17 would hash to the same home key field 22-6. The key 42 is included in the chain because LISCH places part of the chain hashing to home key field 22-6 in the home key field (key field 22-9) of the key 42. Using LISCH, therefore, the chain including 42 and the chain including the keys 17, 28, and 39 coalesce, or combine. Because the chains coalesce, the average number of probes increases. In the example shown, the average number of probes required to reach a key of the example keys 27, 18, 29, 28, 39, 13, 16, 42, and 17 is 1.8 probes.

Figure 2:
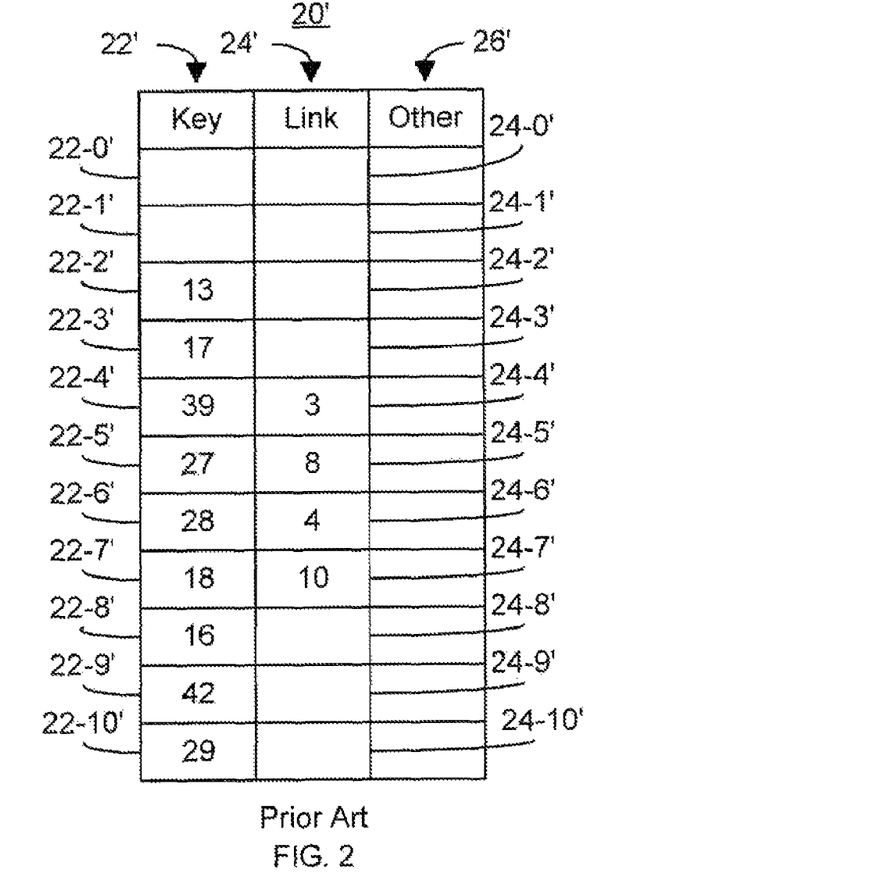
FIG. 2 depicts another conventional hash table using a conventional collision resolution mechanism.

FIG. 2 depicts another conventional hash table 20'. The conventional hash table 20' includes a key field 22', link field 24', and other optional fields 26'. Each field includes locations 0', 1', 2', 3', 4', 5', 6', 7', 8', 9', and 10'. Thus, hash table 20' includes key fields 22-0', 22-1', 22-2', 22-3', 22-4', 22-5', 22-6', 22-7', 22-8', 22-9', and 22-10' with corresponding link fields 24-0', 24-1', 24-2', 24-3', 24-4', 24-5', 24-6', 24-7', 24-8', 24-9', and 24-10'. The conventional hash table 20' uses a conventional collision resolution scheme that precludes coalescing of chains. The particular scheme used is known as DCWC (Direct Chaining Without Coalescing). Other collision resolution schemes that preclude coalescing of chains are known. In DCWC, when a key's home location is occupied by another key and the other key is not at its home location, the other key is moved to a new location. For example, suppose the keys 27, 18, 29, 28, 39, 13, 16, 42, and 17 are desired to be stored in the hash table 20' again using the hash key mod 11. In such a case, the keys would be stored in the same manner as for FIG. 1 until key 42 is hashed. However, the key 42 would hash to the home key field 22-9', in which the key 39 resides. Because the key field 22-9' is not the home key field of the key 39, DCWC is employed. In particular, the chain including keys 28 and 39 is moved (taken out and reinserted), allowing the key 42 to be stored in it home key field 22-9'. The key 28 is stored in the home key field 22-6' and the key 39 is reinserted in the next open key field from the bottom of the table 20', the key field 22-4'. The last key in the list, key 17, is in a chain that includes 28 and 39 and is stored accordingly. Because the chains do not coalesce, the average number of probes decreases. In the example shown, the average number of probes required to reach a key of the example keys 27, 18, 29, 28, 39, 13, 16, 42, and 17 is 1.6 probes.

Although hash tables and collision resolution schemes, particularly those that preclude coalescing of chains, function one of ordinary skill in the art will readily recognize that further improvements in hashing are desired. In particular, a method and system that allow for more efficient searching of keys.

Accordingly, what is needed is a more efficient method and system for storing chains subject to collisions. The present invention addresses such a need.

BRIEF SUMMARY

A method and system for reinserting a chain into a hash table of a computer system are described. The chain includes a plurality of keys. The hash table includes a plurality of key fields and a plurality of link fields associated with the plurality of key fields. The hash table utilizes an initial collision resolution scheme that precludes coalescing of a plurality of chains. The method and system include providing a binary tree including a plurality of nodes corresponding to the plurality of keys of the chain. The plurality of nodes includes a root node corresponding to a root key of the plurality of keys and at least one child node corresponding to at least one child key of the plurality of keys. The method and system also include storing a pair of child keys of the at least one child key in two empty adjacent key fields and storing a first empty adjacent key value of the one of the two empty adjacent key fields in the home link field if the root node is the parent node of more than one child node. The child nodes correspond to the pair of child keys.

According to the method and system disclosed herein, keys are stored in a hash table in a manner that may result in more efficient searching.

DETAILED DESCRIPTION

The method and system relate to storage of data in computer systems. The following description is presented to enable one of ordinary skill in the art to make and use the method and system and is provided in the context of a patent application and its requirements. Various modifications to the embodiments and the generic principles and features described herein will be readily apparent to those skilled in the art. Thus, the method and system are not intended to be limited to the embodiments shown, but is to be accorded the widest scope consistent with the principles and features described herein.

A method and system for reinserting a chain into a hash table of a computer system are described. The chain includes a plurality of keys. The hash table includes a plurality of key fields and a plurality of link fields associated with the plurality of key fields. The hash table utilizes an initial collision resolution scheme that precludes coalescing of a plurality of chains. The method and system include providing a binary tree including a plurality of nodes corresponding to the plurality of keys of the chain. The plurality of nodes includes a root node corresponding to a root key of the plurality of keys and at least one child node corresponding to at least one child key of the plurality of keys. The method and system also include storing a pair of child keys of the at least one child key in two empty adjacent key fields and storing a first empty adjacent key value of the one of the two empty adjacent key fields in the home link field if the root node is the parent node of more than one child node. The child nodes correspond to the pair of child keys.

The method and system will be described in terms of particular hash functions, collision resolution schemes, and hash tables. However, one of ordinary skill in the art will recognize that other hash functions, collision resolution schemes, and hash tables may be used. The method is also described in the context of particular keys, data stored, and addressing schemes. However, one of ordinary skill in the art will readily recognize that other keys and addressing schemes may be used and other data may be stored in the hash table.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
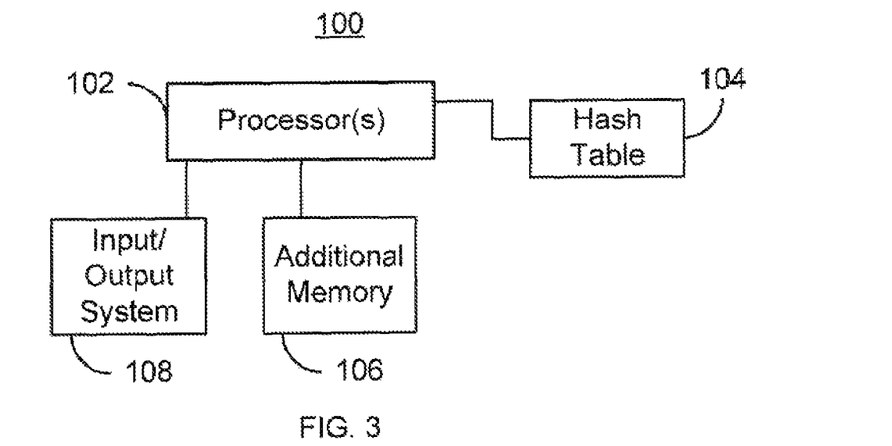
FIG. 3 is a diagram depicting one embodiment of a computer system in accordance with the present invention.

To more particularly describe the present invention, refer to FIG. 3 depicting a computer system 100 used in accordance with the present invention. The computer system 100 includes at least one processor 102, a hash table 104 for storing data, additional memory 106, and an input/output (I/O) system 108. The hash table 104 and additional memory 106 can consist of primary memory or secondary storage or both. Although particular components are shown for the computer system 100, one of ordinary skill in the art will readily recognize that other and/or different components may be provided. The processor 102 may perform a variety of functions including resolving collisions in the hash table 104, as discussed below. The additional memory 106 is used in reinserting chains into the hash table 104. In particular, the additional memory 106 may be used in developing a balanced binary tree, as described below. Note that although depicted separately, the additional memory 106 and the hash table 104 may be implemented in the same portion of memory. The I/O system may include a keyboard, display, ports, and/or other mechanisms allowing the computer system to receive input and provide output.

Figure 4:
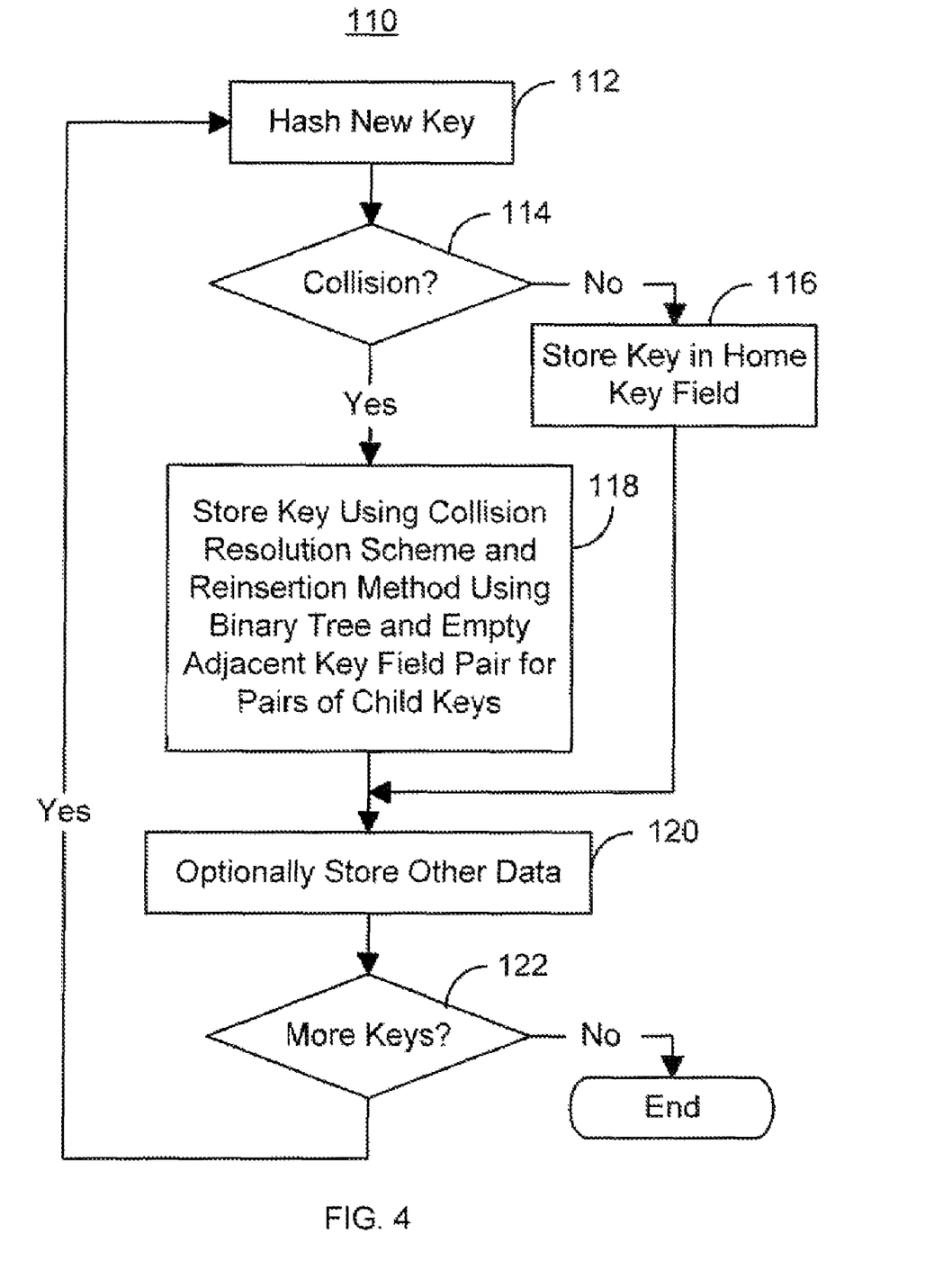
FIG. 4 is a flow chart depicting one embodiment of a method for storing data in accordance with the present invention.

FIG. 4 is a flow chart depicting one embodiment of a method 110 for storing data in accordance with the present invention. The method 110 may be utilized by the computer system 100 and thus is described in the context of the computer system 100. However, one of ordinary skill in the art will recognize that other computer systems having additional and/or different components may be used. The method 110 is used in storing data in the hash table 104. The data stored in the hash table 104 is indexed using a number of keys. Thus, a new key to be stored in the hash table 104 is hashed, via step 112. Thus, a hash function is applied to the key in step 112. It is determined whether there is a collision between the new key and another key, via step 114. Thus, step 114 determines whether the new key is hashed to a key field in which another key is stored. If not, then the new key is simply stored in its home key field, via step 116. If there is a collision, then the new key is stored utilizing a combination of a collision resolution scheme that does not allow coalescing of key chains and a method for reinserting key chains that employs a binary tree and utilizes two empty adjacent key fields for pairs of child keys, via step 118. Examples of a collision resolution scheme that precludes coalescing that might be used in step 118 include, but are not limited to, DCWC and Computer Chaining. In step 118, the keys in the chain are removed, then reinserted. Also note that all collisions are treated similarly, regardless of whether both keys map to the same home key field.

When reinserting chains, a binary tree of the keys in the chain is formed. The binary tree is preferably a balanced binary tree. Each node in the tree corresponds to a key in the chain. Each node in the tree may be a parent node of one or two child nodes. The parent node corresponds to a parent key, while the child node(s) correspond to child key(s). For two child nodes, one child node has a child key that is higher than the parent key, while the other child node has a child key that is lower than the parent key. The child nodes can be considered to be right child nodes or left child nodes. In a preferred embodiment, all right child nodes correspond to child keys having a higher value than the parent key and all left child nodes correspond to child keys having a lower value than the parent key, or vice versa. However, in another embodiment, a different scheme may be used.

If two child nodes are present, then in step 118 two key fields that are empty and adjacent are used to store the child keys for the two child nodes. The empty adjacent key fields are linked to the parent node, preferably by storing the address of one of the key fields in the link field corresponding to the parent key. For parent nodes having one child node, the key a single empty key field may be used to store the child key. The single empty key field is preferably linked to the parent node by storing the address of the key field in the link field of the parent key.

Once the new key has been stored either using step 116 or step 118, any other data may be optionally stored, via step 120. It is determined whether there are additional keys to be stored, via step 122. If so, step 112 is returned to in order to hash the next new key. Otherwise, the method terminates.

Thus, the method 110 may use two empty adjacent key fields when reinserting key chains resolving collisions. Using two empty adjacent key fields may improve the efficiency of searching in the hash table 104. In particular, the average number of probes to find a key may be reduced. Moreover, in a balanced binary tree, a minimum in probe lengths may be achieved. For the child keys of a single parent key, two child keys may be reached with a single link. For example, a lower (e.g. left) child key would be at the address stored in the link, while the higher (e.g. right) child key would reside at the next adjacent address to the address stored in the link. Thus, based upon a parent key and the search key, a matching key may more efficiently be determined.

Figure 5:
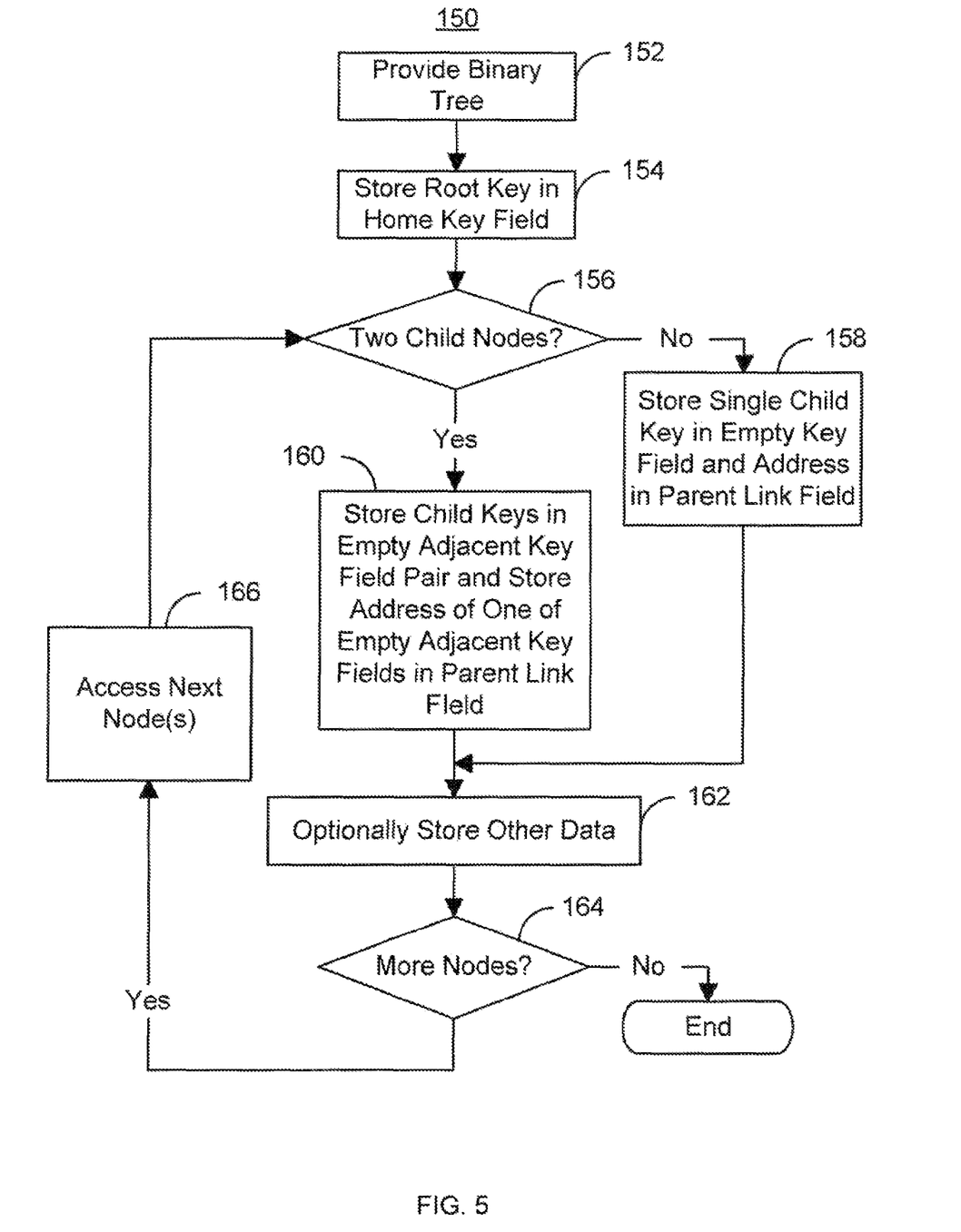
FIG. 5 is a flow chart depicting one exemplary embodiment of a method in accordance with the present invention for reinserting a chain in a hash table.

FIG. 5 is a flow chart depicting one exemplary embodiment of a method 150 in accordance with the present invention for reinserting a chain in a hash table. The method 150 is used in the step 118 of the method 100. Thus, it is assumed that a collision has occurred and that a chain of keys has been removed from the hash table 114 and is to be reinserted. For clarity, the method 150 is described in the context of the computer system 100. However, one of ordinary skill in the art will recognize that other computer systems having additional and/or different components may be used. The method 150 is also described in the context of particular fields. One of ordinary skill in the art will, however, recognize that other fields may be used to store keys or other data. The method 150 is used in connection with a collision resolution scheme that precludes coalescing of separate chains.

A binary tree including a plurality of nodes corresponding to the plurality of keys of the chain is provided, via step 152. The binary tree provided in step 152 is preferably a balanced binary tree and is preferably stored, at least temporarily, in the additional memory 106. In addition, in a preferred embodiment, all child nodes having a child key higher than the parent key of the parent node preferably are on one side of the parent node (e.g. are right child nodes), while all child nodes having a child key lower than the parent key of the parent node preferably are on the other side of the parent node (e.g. are left child nodes). Also in a preferred embodiment single child nodes are either all left child node or all right child nodes. In one embodiment, for example, if only left single child is allowed, the link represents the smaller child key. In another embodiment, if only right single child is allowed, the link represents the larger child key. The binary chain includes a root node that corresponds to a root key. The root node is stored in the hash table 104 in the home location for the chain of keys. Any chain includes at least a root key and at least one child key. The binary tree, therefore, includes the root node and at least one child node. If the chain includes more than three keys, then at least one of the child nodes of the root node also acts as a parent node.

The binary tree is traversed level by level, keys storing in the appropriate locations and providing the appropriate addresses in the link fields using steps 154 through 166. Thus, traversing the binary tree can be considered a single step (having multiple sub-steps) or a multi-step process. The root key is stored in the home key field of the chain in the hash table 104, via step 154. Thus, the first level of the binary tree is accounted for in step 154. It is determined whether the root node has two child nodes, via step 156. If not, then the root node has only a single child node corresponding to a single child key. Thus, the single child key is stored in an empty key field and a value for (or address of) the empty key field is stored in the parent link field, via step 158. The empty key field may be selected in accordance with the collision resolution scheme used. For example, if DCWC is used, the empty key field selected is the first empty key field from the bottom. For a child key of the root node, the parent link field is the home link field. The home link field is the link field corresponding to the home location. If a single child node exists for the root node, the address of the first empty key field is stored in the home link field. Thus, for each level of the balanced binary tree, the key for a child node is stored in an empty key field of the hash table and the address of the empty key field is stored in a link field for a parent node if the node is a single child node.

If it is determined in step 156 that more than one child node exists, then because the tree is a binary tree, there are two child nodes. The pair of child keys for the child nodes are stored in two empty adjacent key fields and the value (or address) of one of the two empty adjacent key fields is stored in the parent link field, via step 160. In a preferred embodiment, the two empty adjacent key fields are the first pair of empty adjacent key fields from the bottom of the hash table 104. Thus, if the root node has two child nodes, the corresponding child keys are stored in two empty adjacent key fields and an address for one of the two empty adjacent key fields is stored in the home link field. In a preferred embodiment, a particular one of the child nodes is always stored in the key field whose address is stored in the parent link field. For example, in one embodiment, the child key for the left child node is store in the key field whose address is stored in the parent link field. Also in a preferred embodiment, the address for the same one of the two empty adjacent key fields is stored in the parent link field. For example, the lower of two empty adjacent key fields may always have its address stored in the parent link field. In addition, as discussed above, when a parent node had two child nodes, the child nodes on the same side of the parent nodes preferably store the child keys that are lower than the parent key. Thus, in a preferred embodiment, either the child key that is lower than the parent key is stored in the key field (of the pair of empty adjacent key fields) having its address stored in the parent link field or the child key that is higher than the parent key is stored in the key field (of the pair of empty adjacent key fields) having its address stored in the parent link field. Thus, the larger child key may accessed by incrementing the value stored in the parent link field. For example, for a particular parent node, a child key for a left child node may be lower than the parent key, may be stored in a first empty key field, and may have the address associated with the first empty key field stored in the parent link field. Similarly, the child key for the right child node of the particular parent node may be higher than the parent key and is stored in the other empty key field of the pair. Thus, for each level of the balanced binary tree, the keys for two child nodes are stored in two empty adjacent key fields and the address of one of the two empty adjacent key fields is stored in a link key field for the parent node if the level includes the two child nodes of the parent node.

Once the keys are stored, any additional storage of data relating to the key(s) may be performed in step 162. It is determined whether the binary tree includes other node(s) corresponding to keys in the chain and that have yet to be reinserted in the hash table 104, via step 164. If so, then the next node(s) are accessed, via step 166. Step 156 is then performed to determine whether the node(s) are a pair of child nodes or a single child node. The steps 156 through up to step 166 may then be repeated until all levels, and thus all nodes, in the binary tree have been accounted for.

Figure 6:
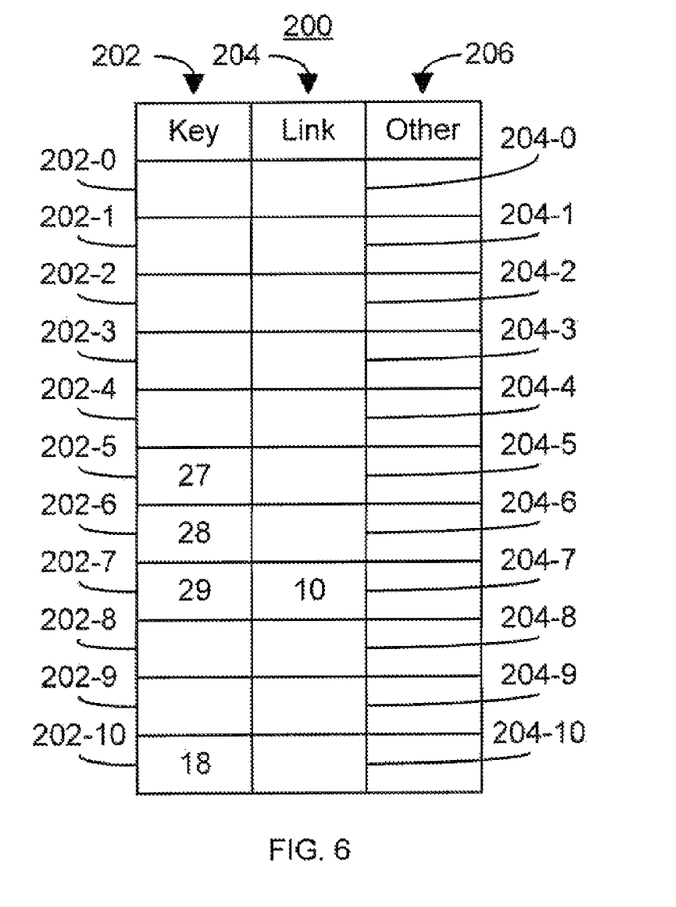
FIGS. 6-11 depict embodiments of binary trees and hash tables in accordance with the present invention.

The method 150 may be further explicated using the keys and hash in the example above. The keys 27, 18, 20, 28, 39, 13, 16, 42, and 17 are desired to be stored using the hash key mod 11. It is also assumed that the method 150 is used in connection with DCWC. In addition, only storage of the keys 39 and 17 are described. FIGS. 6-10 depict embodiments of binary trees and hash tables in accordance with the present invention. For brevity, only reinsertion of the chain including keys 28, 39, and 17 is discussed. In particular, FIG. 6 depicts the hash table 200 having a key field 202, a link field 204, and locations zero through 10 before the key 39 is stored. Thus, the hash table 200 is shown before reinsertion of the key chain including keys 28 and 39. Thus, individual key fields 202-0, 202-1, 202-2, 202-3, 202-4, 202-5, 202-6, 202-7, 202-8, 202-9, and 202-10 and corresponding link fields 204-0, 204-1, 204-2, 204-3, 204-4, 204-5, 204-6, 204-7, 204-8, 204-9, and 204-10 are shown. The key 39 collides with the key 28. Consequently, the keys in the chain are removed and reinserted using the method 150. Thus, a binary tree for the key chain including keys 28 and 39 is built, using step 152.

Figure 7:
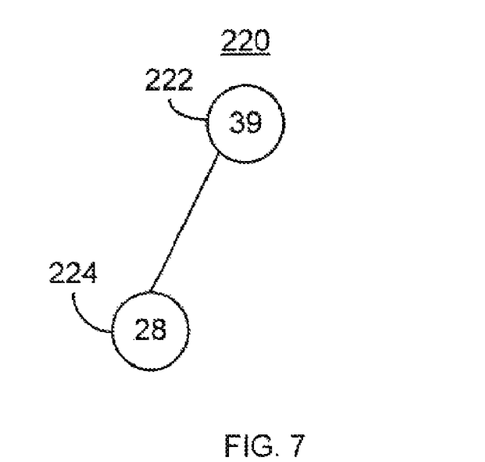
Figure 8:
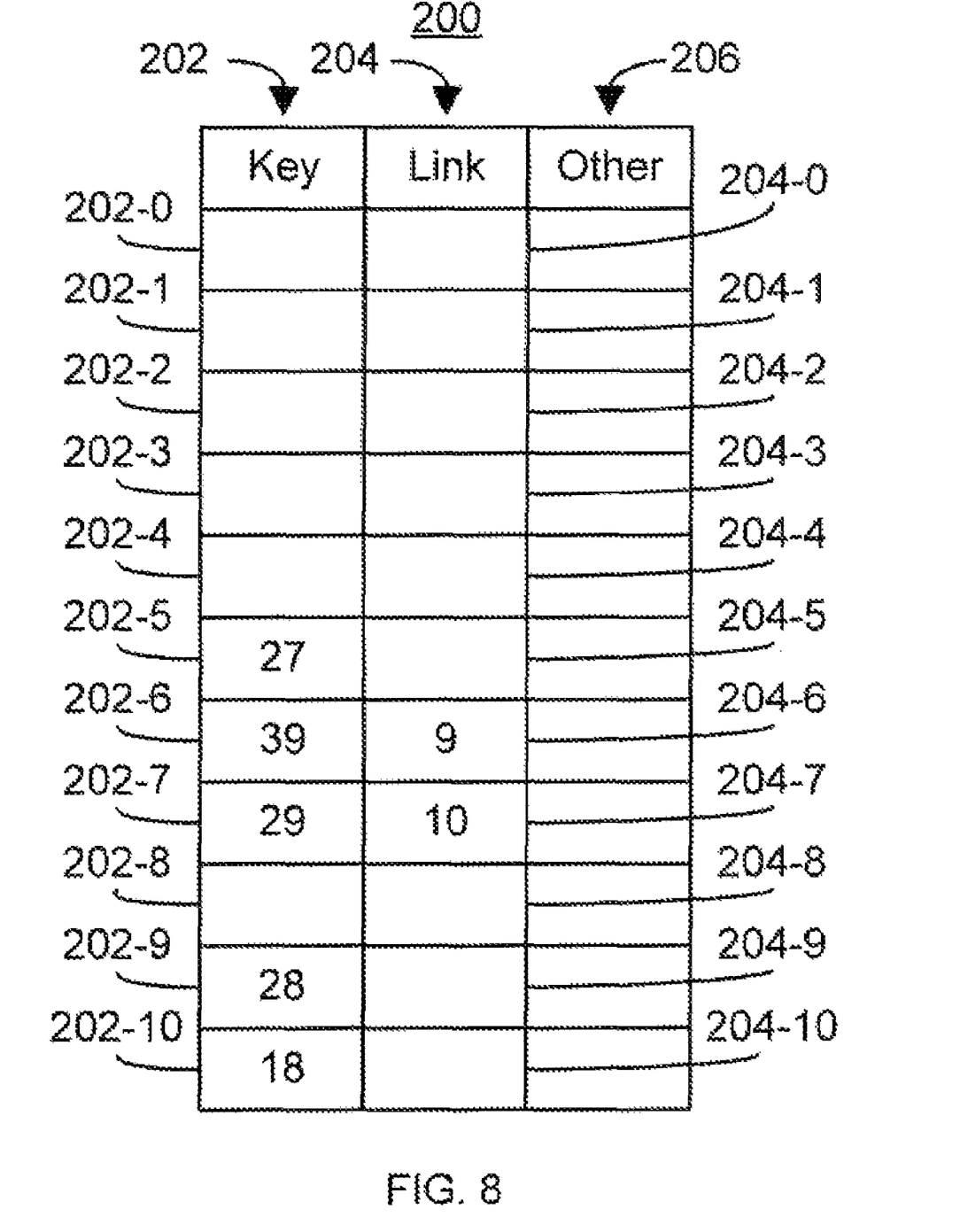

FIG. 7 depicts the binary tree 220 formed for the chain including keys 28 and 39. FIG. 8 depicts the hash table 200 having a key field 202, a link field 204, and locations zero through 10 after the key 39 is stored. In this embodiment, single child nodes are left child nodes and correspond to a child key that is less than the parent key. Thus, the tree 220 includes a parent (and root) node 222 for the key 39 and a child node 224 for the key 28. Thus, the key for the parent node 222 is stored in the home location 202-6. The child key 28 for the child node 224 is stored in the first empty key field 202-9. The address for the key field 202-9 is also stored in the home link field 204-6.

Figure 9:
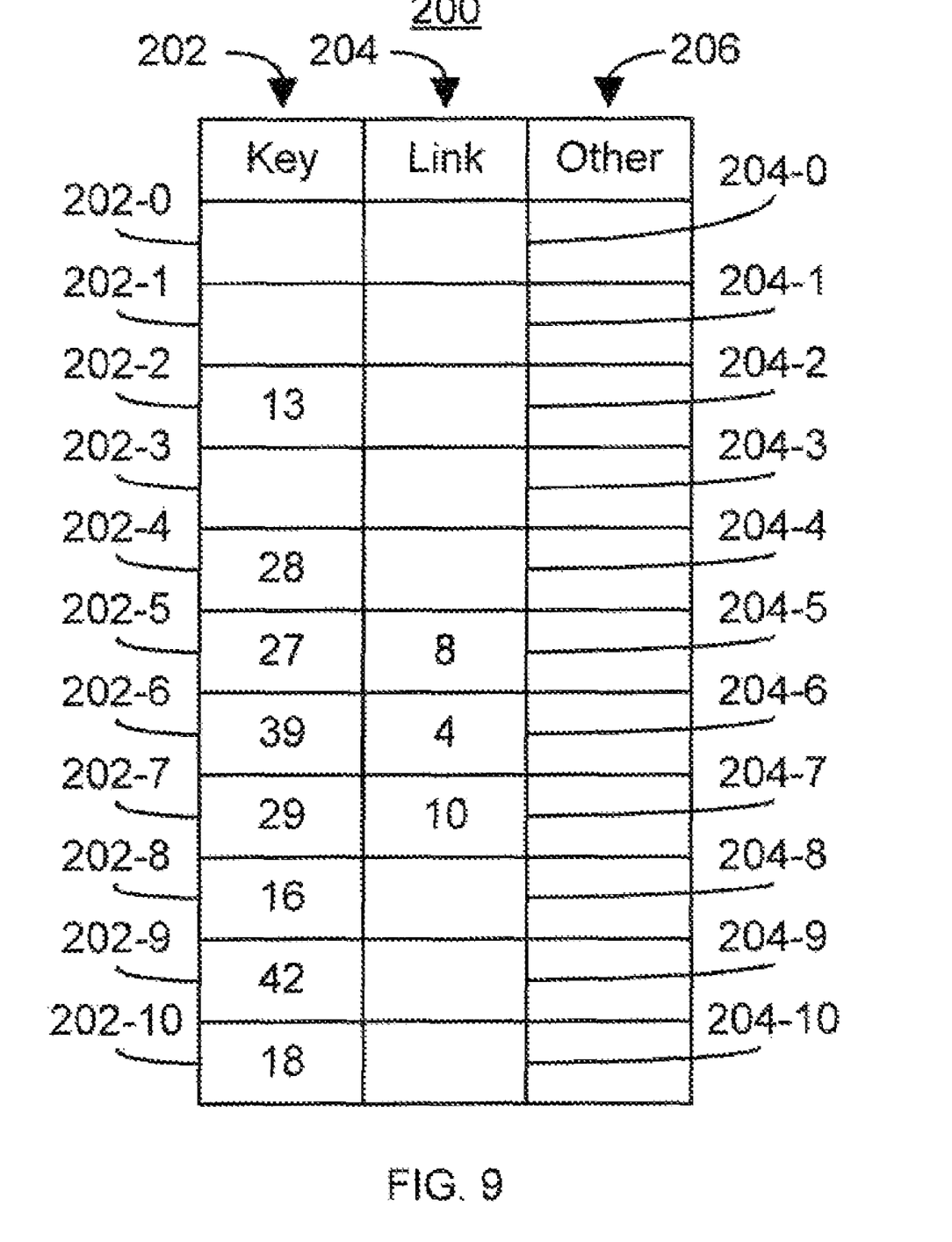

The keys 13 and 16 are then stored without a collision. Thus, the method 105 need not be invoked. The key 42 is then stored. Because the key 42 collides with the key 28 stored in its home key field 202-9, the key chain including keys 28 and 39 is removed and reinserted. Because DCWC is used, the key 42 is stored in its home key field 202-9. The chain including keys 28 and 39 is reinserted using the method 150. The binary tree formed from the chain is still the binary tree 220 depicted in FIG. 7. However, the location of the key 28 changes to the location 202-4. Consequently, the home link field 204-6 is updated to reflect the new address of the child key 39. FIG. 9 depicts the hash table 200 after the key 42 has been stored.

Figure 10:
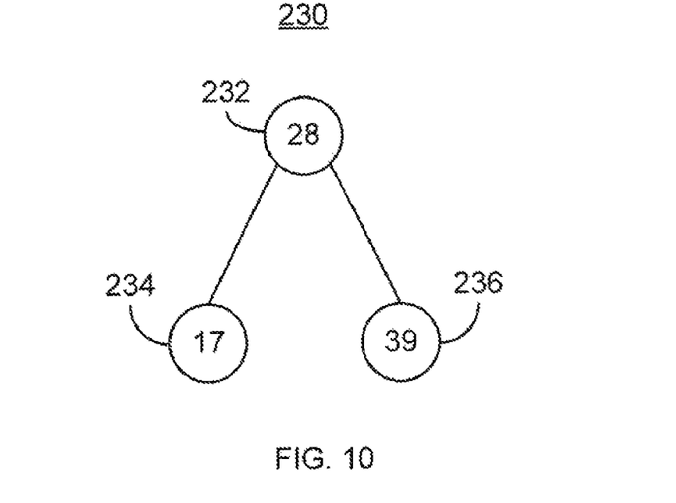
Figure 11:
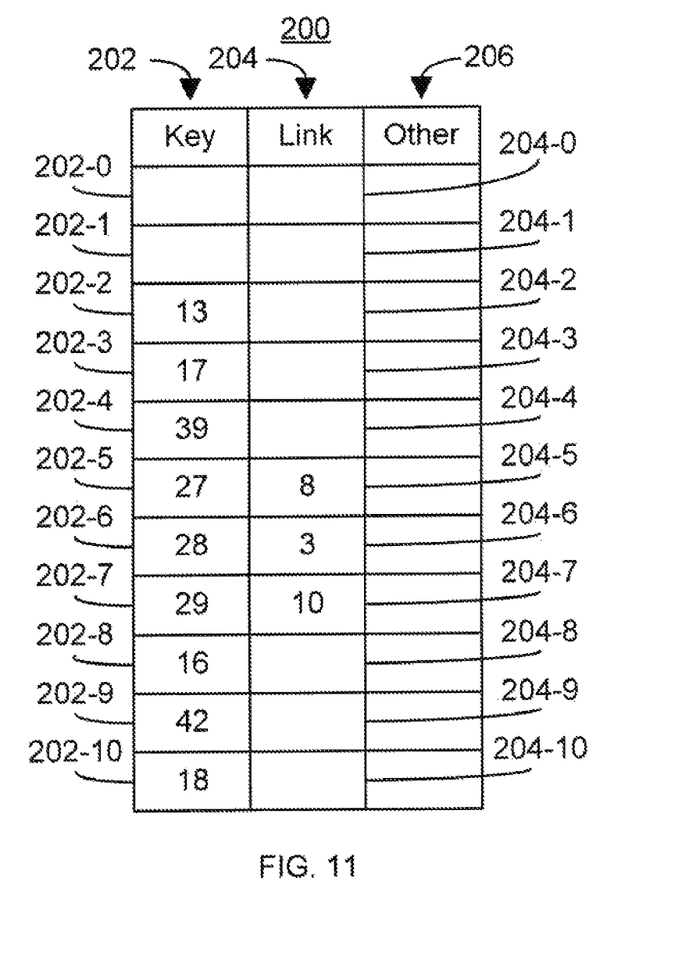

The key 17 collides with the keys 28 and 39. Consequently, the chain including these keys is removed and reinserted using the methods 110 and 150. Thus, a binary tree is formed. FIG. 10 depicts the binary tree 230 including a root node 232 and the two child nodes 234 and 236. As for the binary tree 220, the child node 234 having the key 17 lower than the parent key 28 is the left child node. The root key 28 is stored in the home key field 202-6. The first empty adjacent key fields after removal of the chain are the key fields 202-3 and 202-4. Consequently, the left child key 17 is stored in the location 202-3. The address of this location is stored in the home link field 204-6. The right child key 39 is stored in the next empty adjacent location 202-4. FIG. 11 depicts the hash table 200 after the key 17 has been stored.

Figure 12:
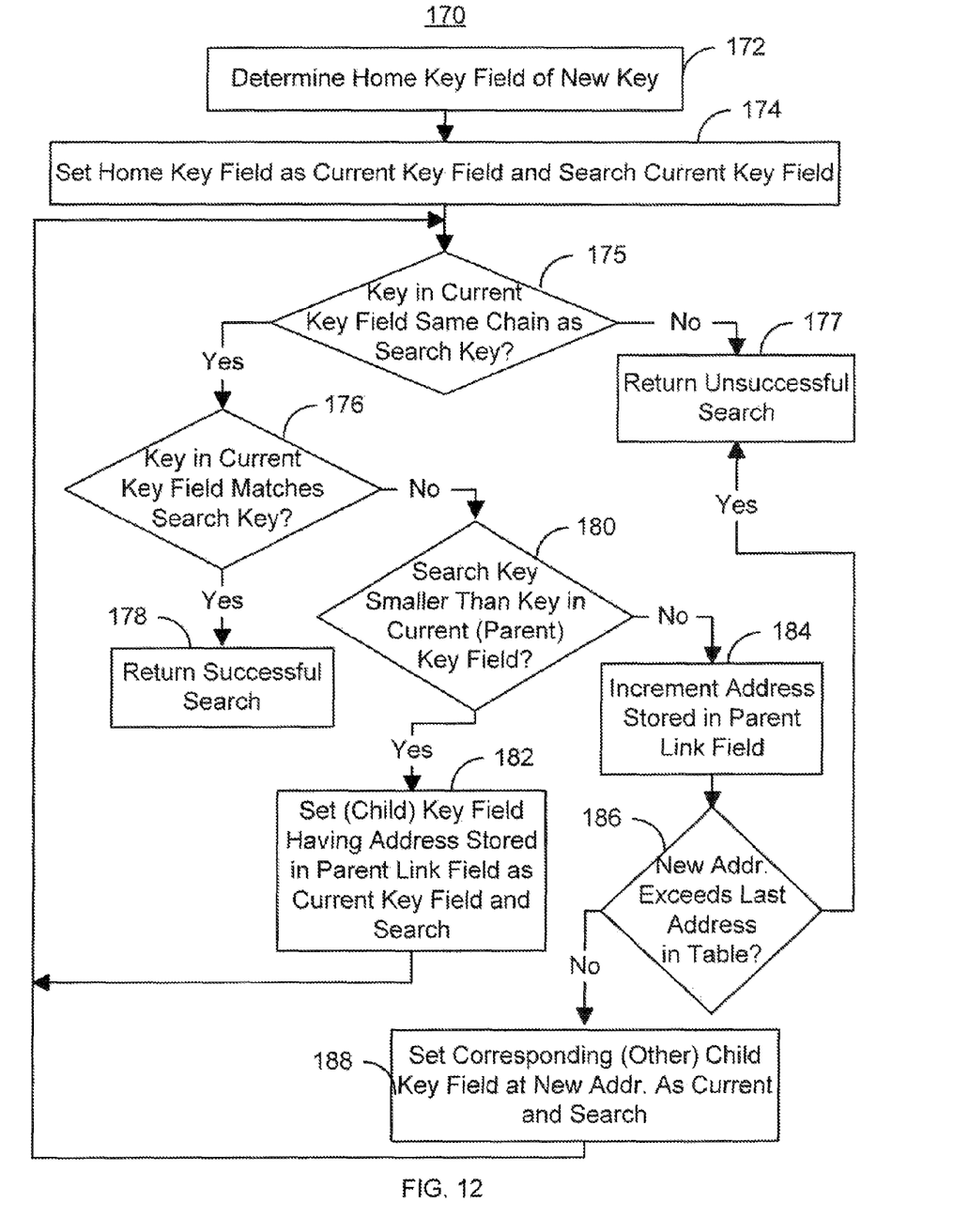
FIG. 12 is a flow chart depicting one exemplary embodiment of a method in accordance with the present invention for searching a hash table.

FIG. 12 is a flow chart depicting one exemplary embodiment of a method 170 in accordance with the present invention for searching a hash table. The method 170 is used for keys stored in accordance with the method 110 and chains reinserted in accordance with the method 150. The search is performed based on a search key that is analogous to the stored keys. The stored keys have also been stored in conjunction with the balanced binary tree described above. As discussed above, all single child nodes are preferably either all left child nodes or all right child nodes. Also in a preferred embodiment, the child nodes on a particular side of the parent node have child keys which share a relationship with the parent key. For example, all child keys for left child nodes may be lower than the parent key, while all child keys for right child nodes may be greater than the parent key. Thus, for single child nodes, the child key are preferably always lower than the parent key or always higher than the parent key. The method 170 is described in the context of the methods 110 and 150 in which all single child keys are lower than the parent key and correspond to left child nodes. The method 170 is also described in the context of the methods 110 and 150 in which for a pair of child nodes, the child key field address stored in the parent link field corresponds to the left child node having the lower child key and in which the address of the (adjacent) key field for the higher child key is found by incrementing the address stored in the parent link field. However, one of ordinary skill in the art will readily be capable of extending the method 170 to other analogous storage schemes.

The home key field is determined for the search key, via step 172. Step 172 includes hashing the search key to determine the home key field of the search key. In the example above, the search key for 28 would be 28 mod 11, or 6. The home key field of the search key is set as the current key field, via step 174. It is determine whether the key stored at the current key field is in the same chain as the search key via step 175. If it is not, the search ends unsuccessfully, via step 177. If so, then it is determined whether the search key matches the key stored at the current key field, via step 176. If so, then the search ends successfully and the corresponding key from the current key field is returned, via step 178. If not, then it is determined whether the search key is smaller than the key stored at the parent key field, via step 180. The first time step 180 is performed, the parent key field is the home key field.

If the search key is lower than the parent key, then key field having the address stored in the parent link field is set as the current key field and searched, via step 182. For the method 170, the left child node of the binary tree always corresponds to a child key lower than the parent key and has its key field address stored in the parent link field. In addition, for the method 170, single child keys are always lower than the parent key and correspond to left child nodes. Thus, step 182 searches the key field for the single child key if only one child is present and searches the key field for the child key having the lower address for a pair of child keys.

If the search key is not lower than the parent key, then the link address stored in the parent link field is incremented, via set 184. It is determined whether the new address exceeds the largest address in the table, via step 186. If so, the search concludes unsuccessfully, in step 177. If not, then this address is set as the current key field and searched, via step 188. For the method 170, the larger child key of a pair of child keys is stored at the key field that is adjacent and lower in the hash table 104 than the lower child key. Consequently, step 184 allows the key field of the remaining child key of a pair of child keys to be searched.

After step 182 or 184 is performed, step 176 is returned to. Thus, if it is determined whether the search key has been found. Steps 176 through 184 may then be reiterated until the search key is found.

Thus, using the method 150, a chain may be reinserted into the hash table 104. A single key for a single child node is simply inserted in an empty key field and the address of the key field stored in the link field of the parent node. For a pair of child keys of a parent node, two empty adjacent key fields may be used. However, in a preferred embodiment, both keys may be accessed using a single link, or probe. In particular, one key may be accessed using the address stored in the parent link field, while the other key may be accessed by incrementing or decrementing the address stored in the parent link field. In addition, the left and right child nodes preferably correspond to child keys having a specified relationship to the parent key.

Because the methods 110 and 150 are used, a search method, such as the method 170, may be used to search for a key. Because of the relationship between the key fields and nodes used, the search is made more efficient. For example, in the example above, in which the keys 27, 18, 20, 28, 39, 13, 16, 42, and 17 are stored, the average number or probes to find a key has been reduced from 1.6 or 1.8 to 1.4, for a twelve to twenty-two percent increase in efficiency. Other key combinations and hash functions may have an even greater improvement in efficiency. Thus, because of the method and system used in reinserting key chains, a matching key may more efficiently be determined.

A method and system for reinserting keys in a hash table are described. The method and system have been described in accordance with the exemplary embodiments shown, and one of ordinary skill in the art will readily recognize that there could be variations to the embodiments, and any variations would be within the spirit and scope of the method and system. Accordingly, many modifications may be made by one of ordinary skill in the art without departing from the spirit and scope of the appended claims.

I claim:

1. A computer implemented method for reinserting a chain into a hash table of a computer system, the chain including a plurality of keys, the hash table including a plurality of key fields and a plurality of link fields associated with the plurality of key fields, the hash table utilizing an initial collision resolution scheme that precludes the coalescing of chains, the method comprising:

hashing at least a first key of the plurality of keys, a second key of the plurality of keys, and a third key of the plurality of keys, wherein hashes of the first key, the second key, and the third key result in a collision of the first key, the second key, and the third key, and wherein the first key is a median key value of the first key, the second key, and the third key;

providing binary tree including a plurality of nodes corresponding to the plurality of keys of the chain, the plurality of nodes including a root node corresponding to the first key, and more than one child node corresponding to the second key and the third key;

storing the first key in a corresponding home key field of the plurality of key fields; and storing the second key and the third key in two empty adjacent fields of the plurality of key fields and storing a first empty adjacent key value of the one of the two empty adjacent key fields in a corresponding home link field of the first key, the more than one child node corresponds to the second key and the third key.

2. The method of claim 1 further comprising:
storing the first key in the corresponding home key field of the plurality of key fields in the hash table, a home link field associated with the corresponding home key field; and
storing either the second key or the third key in an empty key field and storing a value for the empty key field in the home link field if the first node is a parent node of only a single child node corresponding to either the second key or the third key.

3. The method of claim 2 further comprising:
for each remaining level of the binary tree, storing a key for the node in a remaining empty key field of the hash table and storing a remaining empty key field address in a parent link field for a parent node if the node is a single child node of the parent node; and
for each remaining level of the binary tree, storing a pair of remaining keys in two remaining empty adjacent key fields and storing a first remaining empty key address of a first of the two remaining empty adjacent key fields and storing a first remaining empty key address of a first of the two remaining empty adjacent key fields in a parent link field for the parent node if the node is one of two child nodes for the parent node.

4. The method of claim 3 wherein the single node is always a left node or always a right node.

5. The method of claim 2 wherein the empty key field is a first empty key field from a bottom of the hash table and the two empty key fields are a first empty key field pair from a bottom of the hash table.

6. The method of claim 2 wherein the second node is a left child key and the third node is a right child key, the left child key having a lower key value than the right child key.

7. The method of claim 2 wherein the second node is a left child key and the third node is a right child key, the right child key having a lower key value than the left child key.

8. The method of claim 2 wherein the binary tree is a balanced binary tree.

9. The method of claim 2 further comprising:
allowing the hash table to be searched for a search key in the chain, the hash table searching further including
determining a home address for the search key, the home address indicating a corresponding key field for the search key, the corresponding key field being associated with a corresponding link field;
searching the corresponding key field of the home address for the search key;
concluding search as successful and returning the corresponding key from the corresponding key field if the corresponding key matches the search key;
concluding search as unsuccessful if the corresponding key is not in the same chain as the search key;
if the search key is greater than the corresponding key residing at the home address and the link address plus one is greater than the largest address in the table, concluding search as unsuccessful;
if the search key is greater than the corresponding key residing at the home address and the link address plus one is not greater than the largest address in the table, searching the link address plus one for the corresponding link field; and
repeating the link searching steps until the corresponding key matches the search key.

10. A computer-implemented method for reinserting a chain into a hash table of a computer system, the chain including a plurality of keys, the hash table including a plurality of key fields and a plurality of link fields associated with the plurality of key fields, the hash table utilizing an initial collision resolution scheme that precludes coalescing of a plurality of chains, the method comprising:
hashing at least a first key of the plurality of keys, a second key of the plurality of keys, and a third key of the plurality of keys, wherein hashes of the first key, the second key, and the third key result in a collision of the first key, the second key, and the third key, and wherein the first key is a median key value of the first key, the second key, and the third key;
providing a balanced binary tree including a plurality of nodes corresponding to the plurality of keys of the chain, the plurality of nodes including at least one parent node and more than one child node, the at least one parent node including a root node corresponding to the first key, the more than one child node corresponding to the second key and the third key, any single child node of the more than one child node residing on a first side of a corresponding parent node; and
storing the first key in a corresponding home key field of the plurality of key fields in the hash table;
for each level of the balanced binary tree except the root node, storing a key for a node in an empty key field of the hash table and storing an empty key field address in a link field for a parent node if the node is a single child node of the parent node, the empty key field being a first empty key field from a bottom of the hash table, the single child of node of a parent node being either always a left child node or always the right child node;
for each level of the balanced binary tree except the root node, storing a pair of keys for two child nodes in two empty adjacent key fields and storing a first empty key address of a first of the two empty adjacent key fields in a link key field for the parent node if the level includes the two child nodes of the parent node, the two child nodes including the left child node and the right child node, the left child node corresponding to a left child key, the right child node corresponding to a right child key, the left child key having a lower key value than a corresponding parent key value, the right key having a higher value than the corresponding parent key, the two empty adjacent key fields being a first empty key field pair from the bottom of the hash table.

11. A tangible computer-readable storage medium containing program instructions executable on a computer system, the program instructions for reinserting a chain into a hash table of a computer system, the chain including a plurality of keys, the hash table including a plurality of key fields and a plurality of link fields associated with the plurality of key fields, the hash table utilizing an initial collision resolution scheme that precludes coalescing of a plurality of chains, the program including instructions for:
hashing at least a first key of the plurality of keys, a second key of the plurality of keys, and a third key of the plurality of keys, wherein hashes of the first key, the second key, and the third key result in a collision of the first key, the second key, and the third key, and wherein the first key is a median key value of the first key, the second key, and the third key;
providing binary tree including a plurality of nodes corresponding to the plurality of keys of the chain, the plurality of nodes including a root node corresponding to the first key, and more than one child node corresponding to the second key and the third key;

storing the first key in a corresponding home key field of the plurality of key fields; and storing the second key and the third key in two empty adjacent fields of the plurality of key fields and storing a first empty adjacent key value of the one of the two empty adjacent key fields in a corresponding home link field of the first key.

12. The computer-readable medium of 11 wherein the program further includes instructions for:

storing the first key in the corresponding home key field of the plurality of key fields in the hash table, a home link field associated with the corresponding home key field; and storing either the second key or the third key in an empty key field and storing a value for the empty key field in the home link field if the first node is a parent node of only a single child node corresponding to either the second key or the third key.

13. The computer-readable medium of claim 12 wherein the program further includes instructions for:

for each remaining level of the binary tree, storing a key for the node in a remaining empty key field of the hash table and storing a remaining empty key field address in a parent link field for a parent node if the node is a single child node of the parent node; and for each remaining level of the binary tree, storing a pair of remaining keys in two remaining empty adjacent key fields and storing a first remaining empty key address of a first of the two remaining empty adjacent key fields in a parent link field of the parent node if the node is one of two child nodes for the parent node.

14. The computer-readable medium of claim 12 wherein the empty key field is a first empty key field from a bottom of the hash table and wherein the two empty key fields are a first empty key field pair from a bottom of the hash table.

15. The computer-readable medium of claim 12 wherein the second node is a left child key and the third node is a right child key, the left child key having a lower key value than the right child key.

16. The computer-readable medium of claim 12 wherein the second node is a left child key and the third node is a right child key, the right child key having a lower key value than the left child key.

17. The computer-readable medium of claim 12 wherein the binary tree is a balanced binary tree.

18. The computer-readable medium of claim 12 wherein the program further includes instructions for:

allowing the hash table to be searched for a search key in the chain, the hash table searching further; including determining a home address for the search key, the home address indicating a corresponding key field for the search key, the corresponding key field being associated with a corresponding link field;

searching the corresponding key field of the home address for the search key; concluding search as successful and returning the corresponding key from the corresponding key field if the corresponding key matches the search key;

concluding search as unsuccessful if the corresponding key is not in the same chain as the search key;

if the search key is smaller than the corresponding key, searching a link address for the corresponding link field;

if the search key is greater than the corresponding key residing at the home address and the link address plus one is greater than the largest address in the table, concluding search as unsuccessful;

if the search key is greater than the corresponding key residing at the home address and the link address plus one is not greater than the largest address in the table, searching the link address plus one for the corresponding link field; and repeating the link searching steps until the corresponding key matches the search key.

19. A computer-system comprising:

a processor for hashing at least a first key of the plurality of keys, a second key of the plurality of keys, and a third key of the plurality of keys, wherein hashes of the first key, the second key, and the third key result in a collision of the first key, a memory for storing a binary tree including a plurality of nodes corresponding to the plurality of keys of the chain, the plurality of nodes including a root node corresponding to the first key, and more than one child node corresponding to the second key and the third key; and a hash table including a plurality of key fields and a plurality of link fields associated with the plurality of key fields, the hash table utilizing an initial collision resolution scheme that precludes coalescing of a plurality of chains, the chain being reinserted into the hash table, the chain including a plurality of keys, the root key being stored in a home key field of the plurality of key fields in the hash table, a home link field associated with the home key field, a single child key being stored in an empty key field and storing a value for the empty key field in the home link field if the root node is a parent node of only a single child node corresponding to the single child key, a pair of child keys of the more than one child key being stored in two empty adjacent key fields and storing a first empty adjacent key value of the one of the two empty adjacent key fields in the home link field if the root node is the parent node of more than one child node corresponding to the pair of child keys.

20. The computer-system of claim 19 wherein for each remaining level of the binary tree, a key for the node is stored in a remaining empty key field of the hash table and storing a remaining empty key field address in a parent link field for a parent node if the node is a single child node of the parent node and wherein a pair of remaining keys is stored in two remaining empty adjacent key fields and storing a first remaining empty key address of a first of the two remaining empty adjacent key fields in a parent link field for the parent node if the node is one of two child node for the parent node.

* * * * *